US011075580B2

(12) United States Patent
Baorda et al.

(10) Patent No.: US 11,075,580 B2
(45) Date of Patent: Jul. 27, 2021

(54) CURRENT SENSING SYSTEM COMPRISING A SCALED TRANSISTOR AND METHODS OF OPERATION THEREOF

(71) Applicant: STMicroelectronics S.r.l., Agrate Brianza (IT)

(72) Inventors: Roberto Pio Baorda, Casarile (IT); Stefano Ramorini, Arluno (IT); Paolo Angelini, Bologna (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/849,034

(22) Filed: Apr. 15, 2020

(65) Prior Publication Data
US 2020/0244168 A1 Jul. 30, 2020

Related U.S. Application Data

(63) Continuation of application No. 16/380,610, filed on Apr. 10, 2019, now Pat. No. 10,644,599.

(30) Foreign Application Priority Data

Apr. 23, 2018 (IT) .................. 102018000004794

(51) Int. Cl.
*H02M 3/158* (2006.01)
*H02M 1/08* (2006.01)
*H02M 1/00* (2006.01)

(52) U.S. Cl.
CPC ............ *H02M 3/158* (2013.01); *H02M 1/08* (2013.01); *H02M 2001/0009* (2013.01)

(58) Field of Classification Search
CPC .... H02M 3/158; H02M 3/1582; H02M 3/156; H02M 3/335; H02M 1/08;
(Continued)

(56) References Cited

U.S. PATENT DOCUMENTS 9,917,513 B1 3/2018 Le et al.
10,041,982 B2 8/2018 Hu et al.
(Continued)

FOREIGN PATENT DOCUMENTS

CN 206788231 U 12/2017

*Primary Examiner* — Thienvu V Tran
*Assistant Examiner* — Shahzeb K Ahmad
(74) *Attorney, Agent, or Firm* — Slater Matsil, LLP

(57) ABSTRACT

A sensor comprises a first transistor comprising a first control terminal, a second transistor that is a scaled version of and connected to the first transistor and comprising a second control terminal, an operational amplifier connected to both the first and second transistors and configured to generate an intermediate signal at an output terminal, a variable current source, a current mirror, a measurement circuit, and a chopper circuit. The first and second control terminals are configured to receive a drive signal. The variable current source is configured to generate a first variable current as a function of the intermediate signal. The current mirror configured to apply a second variable current proportional to the first variable current to the second transistor. The measurement circuit is configured to generate a measurement signal indicative of current through the first transistor. The chopper circuit is configured to shift an offset of the operation amplifier.

20 Claims, 6 Drawing Sheets

(58) Field of Classification Search
CPC .. H02M 2001/0009; H02M 2001/0025; G05F 3/26; G05F 3/262; G01R 19/0092
See application file for complete search history.

(56) References Cited

U.S. PATENT DOCUMENTS

| | | | |
|---|---|---|---|
| 2006/0044843 A1* | 3/2006 | Oswald | H02M 3/156 363/19 |
| 2009/0284242 A1* | 11/2009 | Motz | H03F 3/393 323/313 |
| 2009/0289702 A1* | 11/2009 | Hsieh | H03F 3/393 330/9 |
| 2010/0289473 A1* | 11/2010 | Ishii | H02M 3/156 323/284 |
| 2014/0253062 A1 | 9/2014 | Qin | |
| 2014/0253089 A1* | 9/2014 | Qin | H02M 3/158 323/316 |
| 2014/0347078 A1 | 11/2014 | Qin | |
| 2018/0095491 A1* | 4/2018 | Lacy | G05F 3/262 |
| 2018/0196457 A1* | 7/2018 | Arai | H03K 17/6871 |
| 2018/0219484 A1 | 8/2018 | Mercer et al. | |
| 2019/0324063 A1 | 10/2019 | Baorda et al. | |

* cited by examiner

US 11,075,580 B2

CURRENT SENSING SYSTEM COMPRISING A SCALED TRANSISTOR AND METHODS OF OPERATION THEREOF

CROSS-REFERENCE TO RELATED APPLICATIONS

This application is a continuation application of U.S. application Ser. No. 16/380,610 filed on Apr. 10, 2019, which claims priority to Italian Patent Application No. 102018000004794, filed on Apr. 23, 2018, which applications are hereby incorporated herein by reference in their entirety.

TECHNICAL FIELD

Embodiments of the present disclosure relate to a current sensing system, an electronic converter, and methods of operation thereof.

BACKGROUND

Switched mode power supplies are well known in the art. For example, FIG. 1 shows an example of a DC-DC boost converter. Specifically, the converter comprises two input terminals 102a and 102b for receiving a DC input voltage $V_{IN}$, wherein the negative input terminal 102b represents a ground GND. The converter comprises also two output terminals 104a and 104b for providing a regulated DC output voltage $V_{OUT}$. Specifically, in case of a conventional boost converter, the output voltage $V_{OUT}$ is (equal to or) greater than the input voltage $V_{IN}$.

For example, the input voltage $V_{IN}$ may be provided by any DC power source, such as a battery or a rectified AC voltage, and the output voltage $V_{OUT}$ may be used to power a load. Accordingly, in operation, the output terminals 104a and 104b will provide a current $I_{OUT}$ to a load connected between the terminals 104a and 104b.

A boost converter typically comprises an inductive energy storage element L, e.g. an inductor, and a diode D, which are connected (e.g. directly) in series between the positive input terminal 102a and the positive output terminal 104a. Specifically, a first terminal of the inductor L is connected (e.g. directly) to the terminal 102a and a second terminal of the inductor L, identified in the following as node Lx, is connected (e.g. directly) to the anode of the diode D and the cathode of the diode D is connected (e.g. directly) to the positive output terminal 104a. Accordingly the diode D is configured to conduct current only in the direction of the load. Usually, the (negative) output terminal 104b is connected (e.g. directly) to ground GND. A boost converter often comprises also an output capacitor COUT connected (e.g. directly) between the output terminals 104a and 104b for stabilizing the output voltage $V_{OUT}$.

In the example considered, the boost converter comprises moreover an electronic switch Q1, usually a transistor, such as field-effect transistor FET, such as a metal-oxide-semiconductor field-effect transistor (MOSFET). Due to the connection to ground GND, usually a n-channel FET (e.g. a NMOS) is used for the transistor Q1. Specifically, this transistor Q1 is configured to selectively connect the node Lx (i.e. the intermediate point between the inductive element L and the diode D) to ground GND as a function of a drive signal $DRV_1$, i.e. the transistor Q1 is connected (e.g. directly) between the node Lx and ground GND. For example, when considering a n-channel FET, the source terminal of the transistor Q1 may be connected to ground GND/terminal 102b and the drain terminal of the transistor Q1 may be connected to the node Lx.

As shown in FIG. 2, when the transistor Q1 is closed during a switch on interval $T_{ON1}$ (see FIG. 2a) a current $I_{IN}$ flows from the positive input terminal 102a and through the inductor L to ground GND, and the inductor L stores energy by generating a magnetic field (see FIG. 2b). Conversely, when the transistor Q1 is opened during a switch on interval $T_{OFF1}$, the current $I_{IN}$ will be reduced as the voltage $V_{OUT}$ is higher than the voltage $V_{IN}$ and the previously created magnetic field will generate a current flow through the diode D and towards the positive output terminal 104a, i.e. the capacitor COUT and the load.

Accordingly, as shown in FIG. 2a, the drive signal $DRV_1$ corresponds to a pulsed signal, which is periodically set to a first logic level, e.g. high, thereby closing the transistor Q1 for duration $T_{ON1}$; and to a second logic level, e.g. low, thereby opening the transistor Q1 for duration $T_{OFF1}$.

In the example considered, the converter comprises thus a control circuit 20 configured to control the operation of the boost converter, in particular the generation of the drive signal $DRV_1$. For example, often this control circuit 20 performs a closed loop control operation in order to control the switching of the transistor Q1 as a function of a feedback signal FB indicative of the output voltage $V_{OUT}$ and/or the output current $I_{OUT}$, in order to regulate the output voltage $V_{OUT}$ and/or the output current $I_{OUT}$ to a desired value.

For example, the circuit may comprise a voltage divider comprising at least two resistors R1 and R2, which are connected in series between the output terminals 104a and 104b, i.e. in parallel with the output capacitor COUT. Accordingly, based on the well-known operation of a voltage divider, the intermediate point between the resistors R1 and R2 provides a (voltage) signal FB indicative of (i.e. proportional to) the output voltage $V_{OUT}$.

Additionally or alternatively, a current sensor may be used to generate a feedback signal FB indicative of the current $I_{OUT}$, such as a shunt resistor connected in series with the terminals 104a and 104b.

In the example considered, the feedback signal FB is provided to the control unit 20, which controls the switching operation of the transistor Q1 as a function of the feedback signal FB. Different control schemes may be implemented within the control unit 20 for controlling the transistor Q1 as a function of the feedback signal(s) FB, which are well known to those skilled in the art.

For example, usually the control circuit 20 comprise a driver circuit 22 and a regulator circuit 24.

In a first type of control scheme, the drive signal $DRV_1$ corresponds to a pulse-width-modulation (PWM) signal, i.e. the driver circuit 22 is a PWM driver circuit. In this case, the signal $DRV_1$ is set for the duration $T_{ON1}$ to the first logic level and for the duration $T_{OFF1}$ to the second logic level, wherein the duration $T_{SW1}=T_{ON1}+T_{OF1F}$ of a switching cycles is constant (see also FIG. 2a). For example, in this case, the regulator circuit 24 may be an error amplifier 24, such as a PI (Proportional-Integral) or PID (Proportional-Integral-Derivative) regulator, which is configured to regulate the duty-cycle $DC_1=T_{ON1}/T_{SW1}$ of the drive signal DRV, as a function of the feedback signal FB until the feedback signal FB corresponds to a reference signal REF, e.g.: increase the duty-cycle $DC_1$ when the feedback signal FB is smaller than a reference signal REF; and decrease the duty-cycle $DC_1$ when the feedback signal FB is greater than a reference signal REF.

In a second control scheme, instead of using a PWM signal, the error amplifier 24 could also vary only one of the durations $T_{ON1}$ and $T_{OFF1}$ (i.e. the other of the durations $T_{ON1}$ and $T_{OFF1}$ may be constant), e.g.: increase the duration $T_{ON1}$ or decrease the duration $T_{OFF1}$ when the feedback signal FB is smaller than a reference signal REF; and decrease the duration $T_{ON1}$ or increase the duration $T_{OFF1}$ when the feedback signal FB is greater than a reference signal REF In a third control scheme, the regulator circuit 24 may also comprise only a simple comparator, which compares the feedback signal FB with the reference signal REF. In this case, the regulator circuit 24 may drive the driver circuit 22 in order to generate a plurality of (short) pulses with fixed/predetermined durations $T_{ON1}$ and $T_{OFF1}$ until the feedback signal FB is greater than the reference signal REF. Accordingly, once the feedback signal FB is greater the reference signal REF, no pulses are generated, i.e. $T_{ON1}$=0. Conversely, when the feedback signal FB is again smaller than the reference signal REF, the regulator circuit 24 may again drive the driver circuit 22 in order to generate one or more further pulses with fixed/predetermined durations $T_{ON1}$ and $T_{OFF1}$. In this case, instead of using a single reference signal REF, also an upper threshold may be used to stop the pulse generation and a lower threshold may be used to start again the pulse generation. Usually, this type of driving is called burst-mode.

Generally, the above schemes may also be combined, e.g. the burst-mode may be used for small output loads and the PWM mode may be used for greater output loads, thereby avoiding that the boost converter is operated with small duty cycles resulting in a Discontinuous Conduction Mode (DCM) operation, in which the losses typically increase. For example, FIG. 2c shows the operation in the DCM mode, wherein the current $I_{IN}$ reaches zero before a new cycle is started.

Thus, generally, the regulator circuit 24 drives the driver circuit 22 in order to vary the (average) duration of the interval $T_{ON1}$ with respect to the (average) duration of the interval $T_{OFF1}$. In fact, the (average) voltage $V_{OUT}$ of an "ideal" boost converter (without losses) may be calculated based on (the average value of) the ratio $D=T_{ON1}/(T_{ON1}+T_{OFF1})$, which essentially corresponds to the duty-cycle of a PWM signal:

$$V_{OUT}=V_{IN}/(1-D) \qquad (1)$$

FIG. 3 shows a second example of a boost converter. Specifically, in the example considered, the diode D of FIG. 1 is replaced with a high-side (power) transistor Q2, which is selectively opened or closed as a function of a drive signal DR V2. For example, in the example considered, the transistor Q2 is a field-effect transistor FET, such as a metal-oxide-semiconductor field-effect transistor (MOSFET). Due to the voltage levels at the transistor, often a p-channel FET (e.g. a PMOS) is used for the transistor Q2.

Specifically, in the example considered, the drain terminal of the transistor Q2 is connected (e.g. directly) to the node Lx and the source terminal of the transistor Q2 is connected (e.g. directly) to the terminal 104a. FIG. 3 shows also the direction of the body diode $D_{Q2}$ which permits a current flow from the drain terminal to the source terminal of the transistor Q2.

The control circuit 20, in particular the driver circuit 24, is thus configured to generate also the drive signal $DRV_2$. Specifically, the control circuit 20/driver circuit 24 is configured to open the transistor Q2 when the transistor Q1 is closed. Conversely, when the transistor Q1 is opened, the transistor Q2 should remain closed (similar to a diode) at least as long as the voltage at the intermediate point between the inductor and the transistor Q1 is greater than the output voltage $V_{OUT}$.

For example, when using the Continuous Conduction Mode (CCM) (as shown in FIG. 2b) or Transition Mode (TM), the driving of the transistor Q2 may be simplified and the control circuit 20/driver circuit 24 may close the transistor Q2 when the transistor Q1 is opened. Accordingly, the switch-off duration $T_{OFF2}$ of the transistor Q2 may correspond to the switch-on duration $T_{ON1}$ of the transistor Q1, and the switch-on duration $T_{ON2}$ of the transistor Q2 may correspond to the switch-off duration $T_{OFF1}$ of the transistor Q1.

The above operation assumes the traditional operation of a boost converter as step-up converter as shown with respect to equation (1), i.e. for $V_{IN}<=V_{OUT}$. However, the converter shown in FIG. 3 may also be used when the input voltage $V_{IN}$ is greater than the output voltage $V_{OUT}$, i.e. $V_{IN}>V_{OUT}$. Specifically, in this case, the converter may be operated in the so-called down-mode or down conversion mode operation.

For example, as shown in FIG. 3, the body diode $D_{Q2}$ bypasses the transistor Q2. By a suitable connection of the transistor Q2 (e.g. by connecting the gate and the bulk terminals of the transistor Q2 to $V_{OUT}$), during the switch off duration $T_{OFF1}$ of the switch Q1, the voltage $V_{Lx}$ at the node Lx will correspond substantially to $V_{OUT}$+0.7 corresponding also to $V_{OUT}$+$VT_{Q2}$ (threshold voltage of Q2). Thus, the diode $D_{Q2}$ is closed and the current provided by the inductor L will flow both through the diode $D_{Q2}$ and the transistor Q2 and charge the capacitor COUT increasing the output voltage $V_{OUT}$. Accordingly, when connecting the gate and the bulk terminals of the transistor Q2 to $V_{OUT}$, the electronic converter may operate with $V_{IN}<V_{OUT}$+0.7 V.

Such an operation and also other schemes of operation (e.g. using a different connection of the gate and bulk terminals of the transistor Q2) of the down-mode are known in the art, e.g. from documents U.S. Pat. No. 5,751,139, US 2004/0135556 A1, EP 0 933 865 A1 or Christian V. Schimpfle, et al. "A Step-Down Conversion Concept for a PWM-mode Boost Converter", Texas Instruments Deutschland GmbH. http://www.ti.com/lit/wp/slva144/slva144.pdf, which are incorporated herein by reference.

Generally, in order to operate a boost-converter in step-up mode and possibly also in down-mode, it may be required to monitor (as alternative or in addition to the voltage $V_{OUT}$) the output current $I_{OUT}$ provided to a load connected to the terminals 104a and 104. For example, as mentioned before, the output current $I_{OUT}$ may be monitored instead of the voltage $V_{OUT}$ in order to generate the feedback signal FB for an output current regulation loop 22/24. Conversely, the output current $I_{OUT}$ may be monitored in addition to the voltage $V_{OUT}$ used by an output voltage regulation loop 22/24 in order to determine the load status of the converter, e.g. in order detect an open load condition (no load is connected to the terminals 104a and 104b) or a short-circuit condition (terminals 104a and 104b are short-circuited), in which the converter may be switched off at least temporarily.

Moreover, the load status may be used to adapt one or more operating parameters of the converter in order to improve the efficiency of the converter. For example, as mentioned before, the load status may be used to switch the operation of the converter from PWM mode to burst mode. Similarly, depending on the current level provided to the load, only certain portions of Q1 and Q2 may be used (e.g. when using plural switches connected in parallel in order to implement the switches Q1 and Q2). Thus, in light load conditions, only a little portion of the power is used in order to reduce switching power losses and increase the overall efficiency. Moreover, the current level may also be used to decide whether a further converter inside the same chip should be activated.

For example, as mentioned before, the output current $I_{OUT}$ may be monitored via a shunt resistor connected in series with the terminals 104a and 104b. However, this has the disadvantage that also such a shunt resistor generates electrical losses.

Thus, it would be advantageously to monitor the current flowing through an already existing component of the converter. For example, the average output current $<I_{OUT}>$ corresponds also to the average current $<I_M>$ flowing through the p-channel FET Q2. Thus, the current $I_{OUT}$ may be monitored by measuring indeed the current $I_M$ flowing (in average) through the p-channel FET Q2.

However, the transistor Q2 usually has a low switch-on resistance. Accordingly, when the transistor Q2 is closed, only a small voltage drop is developed at the terminals of the transistor Q2 due to the current $I_M$ flowing through the transistor Q2. Conversely, when the transistor Q2 is opened and the transistor Q1 is closed, the (significantly greater) output voltage $V_{OUT}$ is applied at the terminals of the transistor Q2.

Accordingly, a current sensing circuit is required, which is able to monitor the current $I_M$ flowing through the p-channel FET Q2 for all operating conditions of the converter. For example, for this reason, a simple differential amplifier connected to the terminals of the transistor Q2 may not be sufficient.

Similarly, it may also be required to measure the current flowing through a n-channel FET, such as the transistor Q1.

SUMMARY

Embodiments of the present invention relate to sensor system comprising a FET and a sensor circuit configured to measure the current flowing through the FET, related integrated circuit, electronic converter and method of operating an electronic converter.

Embodiments of the present disclosure relate solutions for measuring the current flowing through a field effect transistor, such as a p-channel transistor. Specifically, various embodiments of the present disclosure relate to solutions for measuring the current flowing through a high-side switch of an electronic converter, such as a boost converter.

Various embodiments of the present disclosure provide solutions for monitoring the current flowing through a FET. For example, various embodiments are particularly useful for monitoring the current flowing through a p-channel FET, such as a PMOS, such as the high side switch of a boost converter.

Of one or more embodiments, one or more of the above objectives is achieved by means of a sensor system comprising a FET and a sensor circuit configured to measure the current flowing through the FET, the sensor system having the features specifically set forth in the claims that follow. Embodiments moreover concern a related integrated circuit, electronic converter and method of operating an electronic converter. The claims are an integral part of the technical teaching of the disclosure provided herein.

As mentioned before various embodiments relate to a sensor system comprising a FET, such as a power FET, and a respective sensor circuit. Specifically, the sensor circuit is configured to generate a signal indicative of the current flowing through the FET.

For example, such a sensor system may be used in an electronic converter, such as a boost converter as described in the foregoing. For example, an electronic converter comprises usually a switching stage wherein the switching stage may comprise at least one (power) FET, such as a p-channel FET. Accordingly, the sensor circuit may be used to determine a signal indicative of the current flowing through the (power) FET of the switching stage. For example, a control unit of the electronic converter may drive the (power) FET of the switching stage as a function of the signal provided by the sensor circuit.

Generally, a FET comprises a gate terminal and a first and a second terminal (drain and source) defining the current path of the FET.

In various embodiments, the sensor circuit comprises a first FET being a scaled version of the (power) FET, wherein the first terminal of the first FET is connected to the first terminal of the (power) FET and the gate terminal of the first FET is configured to be driven with the drive signal of the (power) FET. For example, in case of p-channel FETs, the first terminal of the (power) FET and the first FET may be the drain terminals.

In various embodiments, the sensor circuit comprises an operational amplifier, wherein a first (positive) input terminal of the operational amplifier is connected to the second terminal of the (power) FET and a second (negative) input terminal of the operational amplifier is connected to a second terminal of the first FET. For example, in case of p-channel FETs, the second terminal of the (power) FET and the first FET may be the source terminals.

In various embodiments, a variable current source is configured to generate a current as a function of the signal at an output terminal of the operational amplifier. For example, in various embodiments, the variable current source comprises a second FET. For example, in this case, the first terminal of the second FET may be connected to a reference voltage and the gate terminal of the second FET may be connected to the output terminal of the operational amplifier, i.e. the second terminal of the second FET provides a current being determined as a function of the signal at the output of the operational amplifier. For example, in various embodiments, the second FET may be a p-channel FET, i.e. the source terminal of the second p-channel FET may be connected to the reference voltage. Moreover, in particular when monitoring the current flowing through a p-channel (power) FET, the voltage at the source terminal of this p-channel FET may be used as reference voltage.

In various embodiments, a current mirror applies a current being proportional to the current generated by the variable current source to the second terminal of the first FET, e.g. the source terminal of the first p-channel FET. For example, in various embodiments, the current mirror comprises two n-channel FETs.

Accordingly, the operational amplifier regulates via the variable current source and the current mirror the voltage at the second terminal of the first FET to the voltage at the second terminal of the (power) FET and a current flows through the first FET, which is proportional to the current flowing through the (power) FET.

In various embodiments, the sensor circuit comprises moreover a measurement circuit configured to generate a measurement signal indicative of the current flowing through the (power) FET by monitoring the current flowing through the first FET and/or the current generated by the variable current source. For example, in various embodiments, the measurement circuit comprises a third FET, wherein the first terminal of the third FET is connected to the reference voltage and the gate terminal of the third FET is connected to the output terminal of the operational amplifier, i.e. the second terminal of the third FET provides a current, wherein the current is proportional to the current generated by the variable current source. For example, in various embodiments, the third FET may be a p-channel FET, i.e. the source terminal of the third p-channel FET may be connected to the reference voltage. Moreover, in particular when monitoring the current flowing through a p-channel (power) FET, the voltage at the source terminal of this p-channel (power) FET may again be used as reference voltage.

In various embodiments, the sensor circuit may comprise a chopper circuit associated with the operational amplifier, wherein the chopper circuit is configured to switch the input and possibly also the output terminals of the operational amplifier as a function of a chopping control signal, thereby moving the offset of the operation amplifier at a higher frequency with respect to the signal frequency, i.e. the frequency of the chopping control signal. In this case, the sensor circuit may comprise also a filter circuit configured to filter the measurement signal in order to remove the frequency of the chopping control signal from the measurement signal.

In various embodiments, the sensor circuit may also be used when the source and gate terminals of the p-channel (power) FET may be short-circuited, e.g. as it may occur when a respective boost converter is operated in a down-mode. Specifically, in this case, the sensor circuit may comprise a fourth p-channel FET being a scaled version of the p-channel (power) FET, wherein the drain terminal of the fourth p-channel FET is connected to the drain terminal of the p-channel (power) FET, the source terminal of the fourth p-channel FET is connected to the source terminal of the first p-channel FET and the gate terminal of the fourth p-channel FET is connected to the source terminal of the fourth p-channel FET.

Accordingly, when the source and gate terminals of the p-channel (power) FET are short-circuited, the operational amplifier regulates via the variable current source and the current mirror again the voltage at the source terminal of the first p-channel FET (and thus also the source terminal of the fourth p-channel FET) to the voltage at the source terminal of the p-channel (power) FET. However, in this case, the first p-channel FET is not used and a current flows through the fourth p-channel FET, which is proportional to the current flowing through the p-channel (power) FET. For example, the use of the fourth p-channel FET may be particularly useful, when the first p-channel FET is implemented with a plurality of p-channel FETs having their current paths connected in series.

BRIEF DESCRIPTION OF THE DRAWINGS

Embodiments of the present disclosure will now be described with reference to the annexed drawings, which are provided purely by way of non-limiting example and in which:

FIGS. 8A-8F, shows exemplary wave-forms of the boost converter of FIG. 7.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
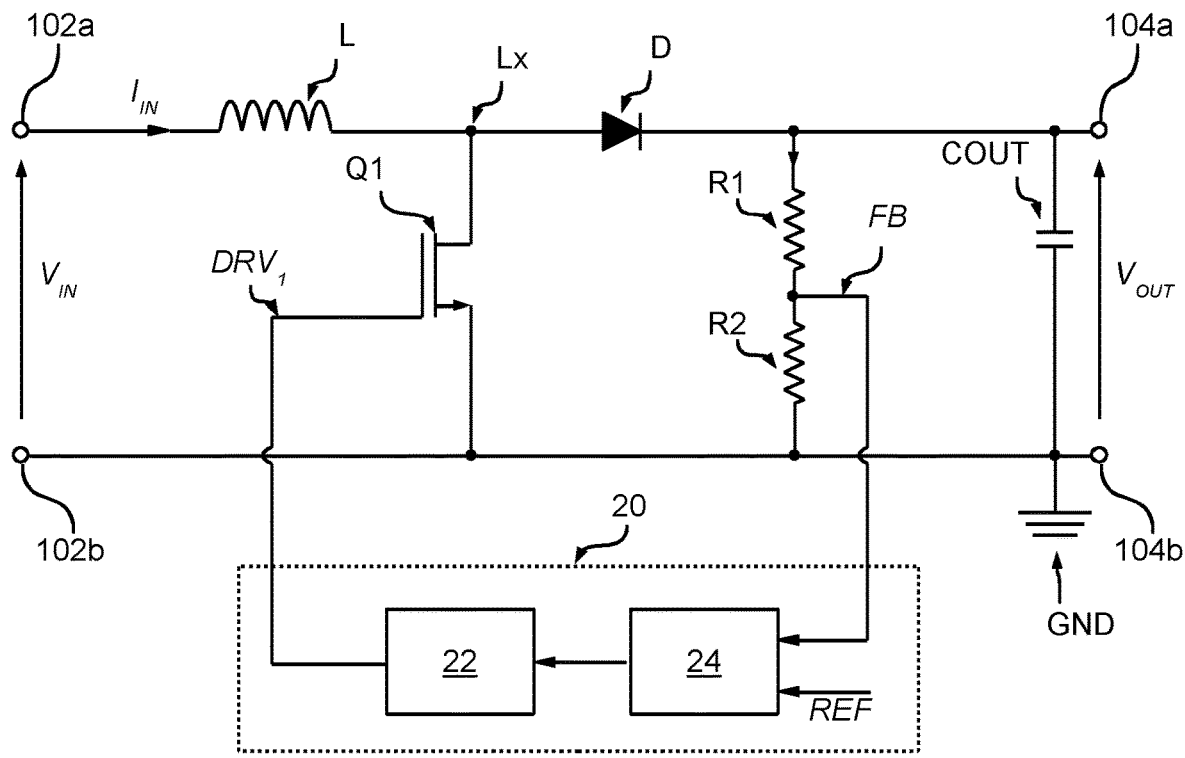
FIG. 1 shows a first example of a boost converter.
Figure 2:
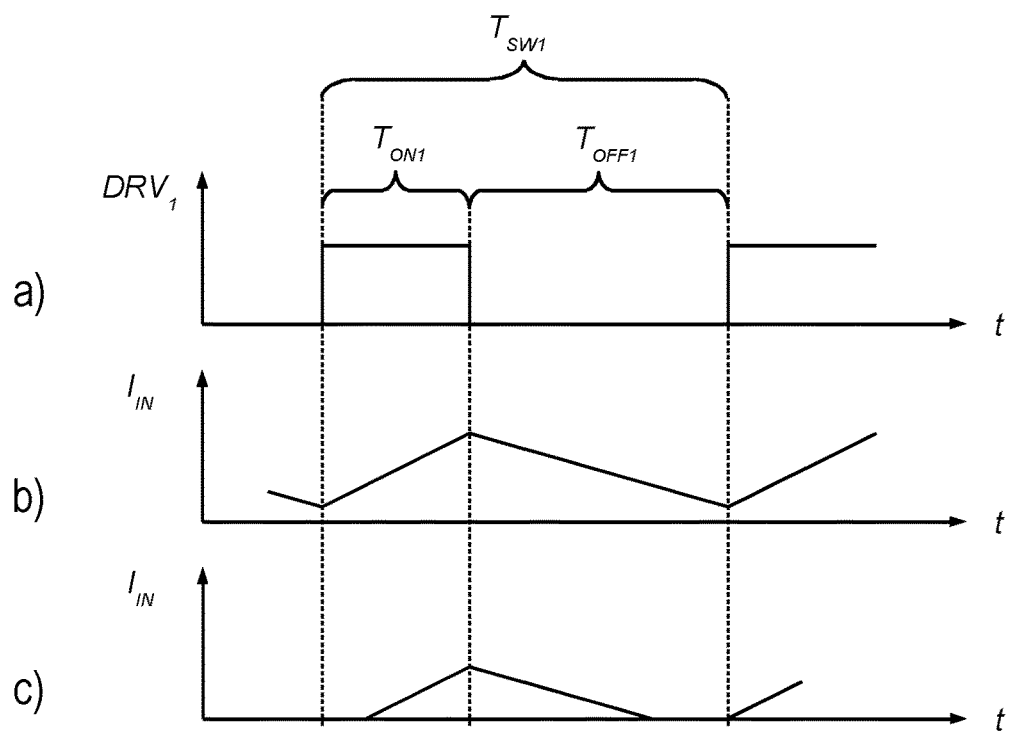
FIG. 2 shows typical wave-forms of the boost converter of FIG. 1.
Figure 3:
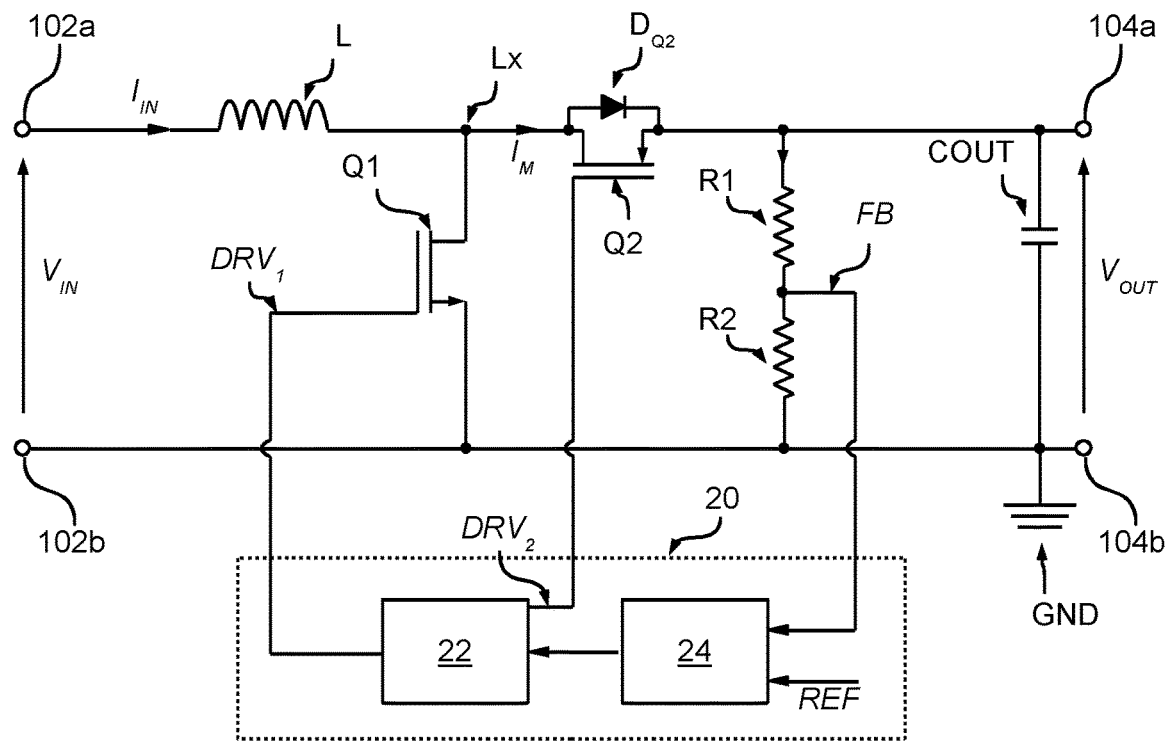
FIG. 3 shows a second example of a boost converter.

In the following FIGS. 4 to 9 parts, elements or components which have already been described with reference to FIGS. 1 to 3 are denoted by the same references previously used in such Figures; the description of such previously described elements will not be repeated in the following in order not to overburden the present detailed description.

As mentioned before, the present description relates to solutions for monitoring the current $I_M$ flowing through a FET, such as a p-channel FET, such as a PMOS. For example, the solutions disclosed herein may be used to monitor the current $I_M$ flowing through a high-side transistor, such as the second transistor Q2, of a boost converter. However, in general the solution may also be used to monitor the current flowing through an n-channel FET, such as an NMOS, such as the first transistor Q1 shown in FIGS. 1 and 3.

Figure 4:
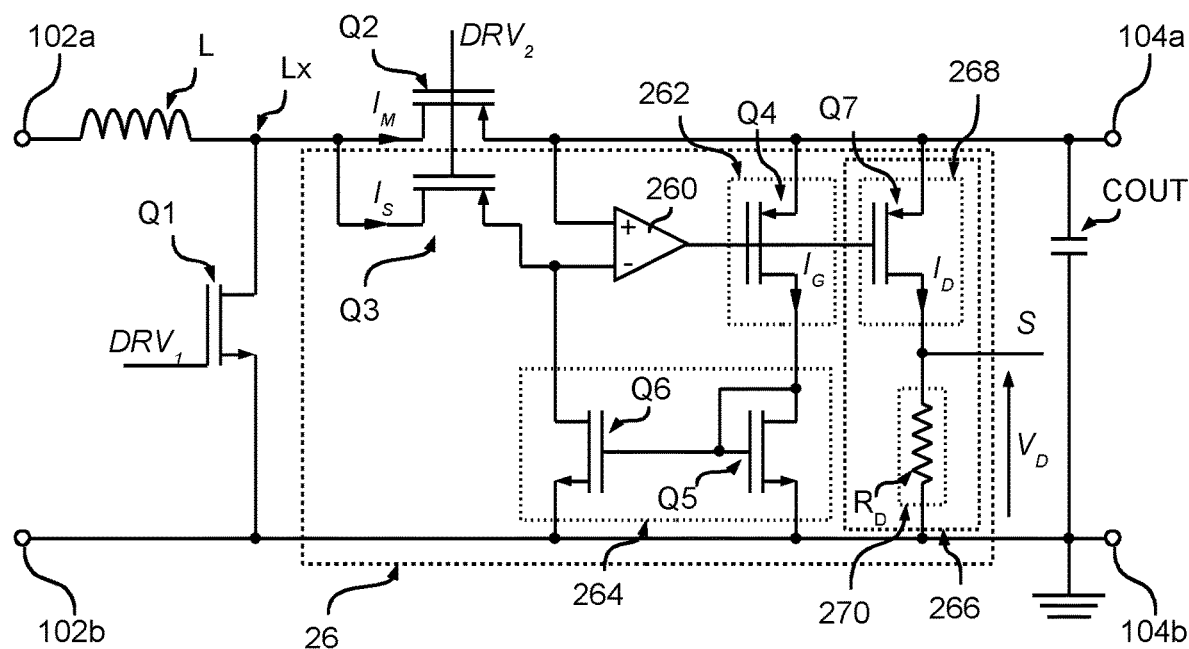
FIG. 4 shows a first embodiment of a boost converter comprising a sensor circuit in accordance with the present description.

For example, FIG. 4 shows an embodiment of a boost converter in accordance with the present description.

Specifically, in line with the description of FIGS. 1 to 3, the boost converter comprises two input terminals (positive input terminal 102a and negative input terminal 102b) for receiving a DC input voltage $V_{IN}$ and two output terminals (positive output terminal 104a and negative output terminal 104b) for providing a regulated voltage $V_{OUT}$ or a regulated current $I_{OUT}$, wherein the negative output terminal 104b is connected (e.g. directly) to the negative input terminal 102b, which represents a ground GND.

In the embodiment considered, an inductor L and a second transistor Q2, such as a PMOS, are connected (e.g. directly)

in series between the positive input terminal 102a and the positive output terminal 104a. Specifically, a first terminal of the inductor L is connected (e.g. directly) to the positive input terminal iota, a second terminal of the inductor L is connected (e.g. directly) to the drain terminal of the second transistor Q2 (identified in the following again as node Lx), and the source terminal of the second transistor Q2 is connected (e.g. directly) to the positive output terminal 104a.

In the embodiment considered, an electronic switch is connected (e.g. directly) between the node Lx (intermediate point between the inductor L and the second transistor Q2) and ground GND. For example, the electronic switch may be a transistor, such as the first transistor Q1, such as an n-channel FET, e.g. an NMOS. Specifically, this first transistor Q1 is configured to selectively connect the node Lx to ground GND.

In various embodiments, a capacitor COUT may be connected (e.g. directly) between the positive output terminal 104a and the negative output terminal 104b.

In various embodiments, as mentioned before, the control/gate terminal of the switch/first transistor Q1 and the gate terminal of the second transistor Q2 may be driven by means of respective drive signals $DRV_1$ and $DRV_2$ generated by a control circuit 20.

Accordingly, the architecture of the boost converter corresponds to the converters described in the introductory portion and the respective description applies fully.

In the embodiment considered, the electronic converter comprises also a sensor circuit 26 configured to generate a measurement signal S indicative of the current $I_M$ flowing through the second transistor Q2.

For example, in the embodiment considered, the sensor circuit 26 comprises a third transistor Q3 such as a p-channel FET, such as a PMOS FET. Specifically, in various embodiments, the third transistor Q3 corresponds to a scaled version of the second transistor Q2. Specifically, in various embodiments, the ratio W/L (width to length) of both second transistor Q2 and the third transistor Q3 is scaled. For example, in various embodiments, the length L of both second transistor Q2 and the third transistor Q3 corresponds, but the width W is different. However, generally, also the length L could be varied or both parameters could be varied. For example, for this purpose, the sensor circuit 26 and the second transistor Q2 may be integrated within the same integrated circuit. For example, in the context of a boost converter, the first transistor Q1, the second transistor Q2, the control circuit 20 and the sensor circuit 26 may be implemented in an integrated circuit (IC). In the embodiment considered, the sensor circuit 26 comprises moreover an operational amplifier 260, a variable current source 262 and a current mirror 264.

Specifically, in the embodiment considered, the non-inverting/positive terminal (or generally a first input terminal) of the operational amplifier 260 is connected (e.g. directly) to the source terminal of the second transistor Q2. Conversely, the inverting/negative terminal (or generally a second input terminal) of the operational amplifier 260 is connected (e.g. directly) via the third transistor Q3 to the drain terminal of the second transistor Q2. Specifically, in the embodiment considered, the source terminal of the third transistor Q3 is connected to the inverting/negative terminal of the operational amplifier 260 and the drain terminal of the third transistor Q3 is connected to the drain terminal of the second transistor Q2. Finally, the gate terminal of the third transistor Q3 is connected to the gate terminal of the second transistor Q2, or generally the drive signal of the third transistor Q3 correspond to the drive signal $DRV_2$ of the second transistor Q2 when the converter is operated in the step-up mode.

In the embodiment considered, the output of the operational amplifier 260 drives the variable current source 262, which thus is configured to generate a current $I_G$ as a function of the signal at the output of the operational amplifier 260.

Specifically, in the case of a boost converter, the second/source terminal of the second transistor Q2 is connected to the positive output terminal 104a, and thus to the regulated voltage $V_{OUT}$. Accordingly, the variable current source 262 may be powered via the voltage $V_{OUT}$, i.e. the source terminal of the second transistor Q2.

For example, in the embodiment considered, the variable current source 262 is implemented with a fourth transistor Q4, such as a p-channel FET, such as a PMOS FET. Specifically, in the embodiment considered, the source terminal of the fourth transistor Q4 is connected (e.g. directly) to the source terminal of the second transistor Q2 (i.e. to the voltage $V_{OUT}$) and the gate terminal is connected to the output of the operational amplifier 260. Accordingly, the drain terminal of the fourth transistor Q4 will provide a current $I_G$ being determined as a function of (e.g. at least in part proportional to) the signal at the output of the operational amplifier 260.

In the embodiment considered, the variable current $I_G$ generated by the variable current source 262 (e.g. the current provided via the drain terminal of the fourth transistor Q4) is applied via the current mirror 264 to the source terminal of the third transistor Q3.

For example, in the embodiment considered, the current mirror 264 is connected to ground GND and is thus implemented with a current mirror comprising two transistors (a fifth transistor Q5 and a sixth transistor Q6), such as n-channel FETs, such as NMOS FETs. Specifically, in the embodiment considered, the drain terminal of the fifth transistor Q5 is connected to the output of the variable current source 262, e.g. the drain terminal of the fourth transistor Q4, the source terminal of the fifth transistor Q5 is connected to ground GND, and the gate terminal of the fifth transistor Q5 is connected to the drain terminal of the fifth transistor Q5. Conversely, the gate terminal of the sixth transistor Q6 is connected to the gate terminal of the fifth transistor Q5, the source terminal of the sixth transistor Q6 is connected to ground GND, and the drain terminal of the sixth transistor Q6 is connected to the source terminal of the third transistor Q3

Thus, in the embodiment considered, the current mirror 264 imposes the current $I_G$ generated by the variable current source 262 also on the third transistor Q3.

Accordingly, the current mirror 264 implements a feedback loop of the current $I_G$ provided by the variable current source 262. Specifically, the operational amplifier 260 is configured to vary via this feedback loop the current $I_G$ generated by the variable current source 262 in order to keep the voltage V− at the inverting/negative input of the operational amplifier 260 equal to the voltage V+ at the non-inverting/positive input of the operational amplifier 260. Thus, in the stable condition (V+=V−), the voltage $V_{DS3}$ between the drain and source terminals of the third transistor Q3 corresponds to the voltage $V_{DS2}$ between the drain and source terminals of the second transistor Q2.

However, due to the scaling of the second transistor Q2 with respect to the third transistor Q3, only a fraction of the current $I_M$ flowing through the second transistor Q2 will flow through the third transistor Q3, i.e. the current $I_S$ flowing through the third transistor Q3 is proportional to the current $I_M$ flowing through the second transistor Q2:

$$I_S = I_M/M \quad (2)$$

Generally, also the current mirror 264 may perform a scaling, i.e. the current $I_G$ provided by the variable current source 262 may not necessarily be identical to the current $I_S$, but may only be proportional to the current $I_S$.

Thus, in order to determine a value indicative of the current $I_M$ flowing through the second transistor Q2, the sensor circuit 26 may comprise a sensing circuit such as measurement circuit 266 configured to measure, e.g., the current $I_S$ flowing through the third transistor Q3 (corresponding to the current flowing through the output of the current mirror 264); and/or the current $I_G$ provided by the variable current source 262 (corresponding to the current flowing through the input of the current mirror 264).

For example, in the embodiment considered, the measurement circuit 266 comprises a variable current generator 268 configured to generate a variable current $I_D$ as a function of the current $I_G$, which is thus proportional to the current $I_M$.

For example, in the embodiment considered and similar to the variable current source 262, the variable current generator 268 is implemented with a seventh transistor Q7, such as a p-channel FET, such as a PMOS. Specifically, in the embodiment considered, the source terminal of the seventh transistor Q7 is connected to the source terminal of the second transistor Q2 (i.e. to the voltage $V_{OUT}$) and the gate terminal is connected to the gate terminal of the fourth transistor Q4. Accordingly, in the embodiment considered, the fourth transistor Q4 and the seventh transistor Q7 are driven by the same gate-source voltage and thus provide the same current (or again the currents $I_G$ and $I_D$ are at least proportional). Accordingly, the drain terminal of the seventh transistor Q7 will provide a current $I_D$ being proportional to the current $I_M$.

Accordingly, the measurement signal S may correspond to the current $I_D$. In case the measurement signal S should be a voltage signal, the measurement circuit 266 may also comprise a current-voltage conversion circuit 270, such as e.g. a resistor $R_D$ connected (e.g. directly) between the output of the variable current generator 268, e.g. the drain terminal of the seventh transistor Q7, and ground GND. Accordingly, in the embodiment considered, the voltage $V_D$ at the resistor $R_D$ will be proportional to the current $I_M$ flowing through the second transistor Q2.

For example, the measurement signal S generated by the sensor circuit 26 and being indicative of/proportional to the current $I_M$, e.g. the current $I_D$ or the voltage $V_D$, may be provided to the control circuit 20, which may drive the first transistor Q1 and the second transistor Q2 as a function of this measurement signal S. For example, the control circuit 20 may perform an averaging operation in order to calculate a value indicative of the average current $I_M$, which thus is also indicative of the average value of the output current $I_{out}$ of the converter.

Generally, a similar sensor circuit may also be used to monitor the current flowing through an n-channel FET, such as the first transistor Q1. In fact, in various embodiments in accordance with the present description, the sensor circuit 26 comprises a third FET being a scaled version of the FET to be monitored (e.g. the first or second FET). In particular, a first terminal of the third FET is connected to a first terminal of the FET to be monitored. For example, in the case of p-channel FETs, the first terminal is the drain terminal.

Moreover, the gate terminal of the third FET is configured to be driven with the drive signal $DRV_1/DRV_2$ of the FET to be monitored.

Specifically, the sensor circuit comprises also a regulation loop comprising an operational amplifier 260, a variable current source 262, and a current mirror 264. A first input terminal of the operational amplifier 260 is connected to the second terminal (e.g. 104a) of the FET to be monitored and a second input terminal of the operational amplifier 260 is connected to the second terminal of the third FET. The variable current source 262 generates a current $I_G$ as a function of the signal at the output terminal of the operational amplifier 260, and the current mirror 264 applies a current being proportional to the current $I_G$ generated by the variable current source 262 to the second terminal of the third FET. Accordingly, the operational amplifier 260 regulates via the variable current source 262 and the current mirror 264 the voltage at the second terminal of the third FET to the voltage at the second terminal (e.g. 104a) of the FET to be monitored and a current $I_S$ flows through the third FET, which is proportional to the current $I_M$ flowing through the FET to be monitored.

A measurement circuit 266 may thus generate a measurement signal S indicative of the current $I_M$ flowing through the FET to be monitored by monitoring the current $I_S$ flowing through the third FET and/or the current $I_G$ generated by the variable current source 262.

The sensor circuit 26 of FIG. 4 is able to monitor the current $I_M$ also for small voltage drops between the drain and source terminal of the second transistor Q2, which (for low power applications) may be in the range of 1 to 5 mV, for a typical switch on resistance of 50 mΩ of the second transistor Q2. However, in order to implement a precise monitoring of the current $I_M$, a trimming of the offset of the operational amplifier 260 may be required.

Figure 5:
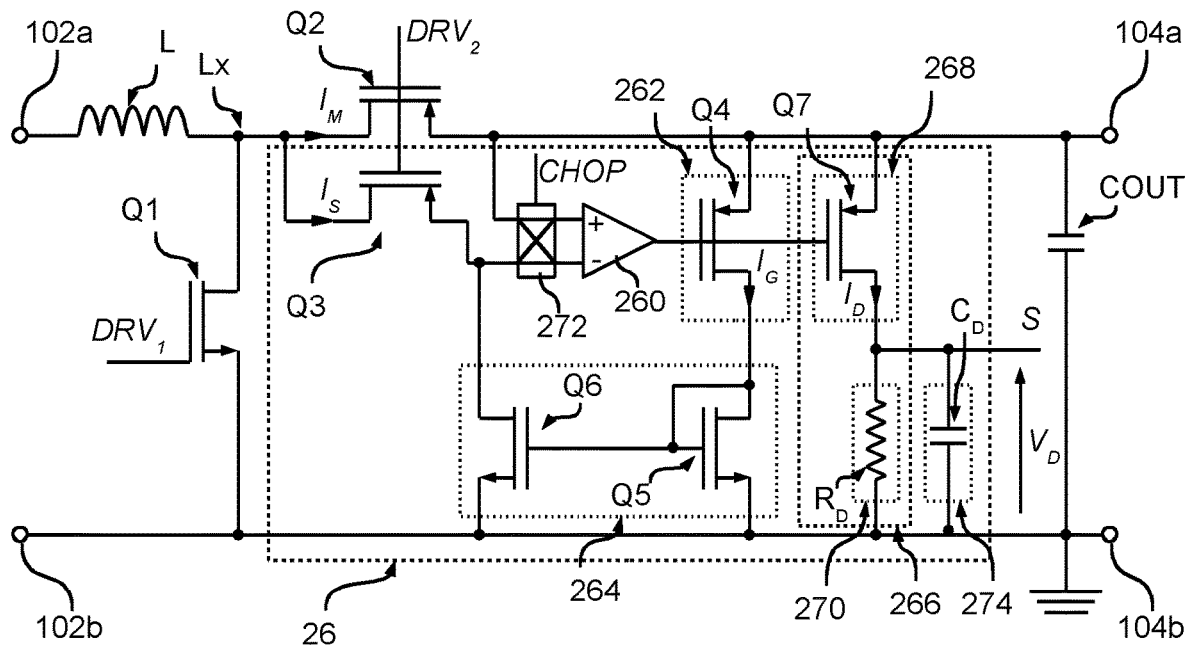
FIG. 5 shows a second embodiment of a boost converter comprising a sensor circuit in accordance with the present description.

FIG. 5 shows an embodiment of the sensor circuit which overcomes or at least reduces this concern.

Specifically, in the embodiment considered, a chopper circuit 272 is associated with the operational amplifier 260. Specifically, the chopper circuit 272 is configured to switch the input and possibly also the output terminals of the operational amplifier 260 in order to move the offset of the operation amplifier 260 at a higher frequency with respect to the signal frequency. The operation of such a chopper circuit 272 is known in the art, e.g. from R. Wu et al., Precision Instrumentation Amplifiers and Read-Out Integrated Circuits, "Chapter 2—Dynamic Offset Cancellation Techniques for Operational Amplifiers", Analog Circuits and Signal Processing, DOI: 10.1007/978-1-4614-3731-4_2, Springer Science+Business Media New York 2013 Generally, the chopper circuit 272 may also be integrated in the operational amplifier 260.

Specifically, in the embodiment considered, the chopper circuit 272 is configured to perform the chopping operation based on a signal CHOP. For example, in various embodiments, the signal CHOP may be provided by the control circuit 20. For example, in various embodiments, the CHOP may be pulsed signal, which is periodically set for a duration $T_{SW1}$ (i.e. one switching cycle of the second transistor Q2) to a first logic level and then for a duration $T_{SW1}$ (i.e. one switching cycle of the second transistor Q2) to a second logic level.

Accordingly, by switching the input and/or output terminals of the operational amplifier 260, the chopper circuit 272 moves the offset of the operation amplifier 260 at a higher frequency with respect to the signal frequency. Accordingly, in the embodiment considered, the offset of the operational amplifier 260 will be modulated with the frequency $F_{chop}$ of the signal CHOP, which e.g. may be $F_{chop}=1/(2\ T_{SW1})$. Accordingly, in various embodiments, the sensor circuit 26 and/or the control circuit 20 may comprise a filter 274 configured to filter the sensed measurement signal S, e.g. the current $I_D$ or the voltage $V_D$, in order to remove the frequency $F_{chop}$.

For example, this filter 274 may be an analog low-pass or band-pass filter having an upper frequency being smaller than the minimum frequency $F_{chop}$ of the signal CHOP.

In various embodiments, the filter 274 may also be used to obtain directly the mean value of the measurement signal S and thus the current $I_M$. In fact, as mentioned before, the control circuit 20 may indeed operate with the mean value of the current $I_M$ rather than the instantaneous value thereof. Thus, by filtering the measurement signal S, the filter 274 may be dimensioned in order to perform both operations contemporaneously, insofar as in both cases may be used, e.g., a low-pass-filter.

For example, in the embodiment considered, the filter 274 may be an analog low-pass filter that is connected between the measurement signal S and ground, i.e. in parallel with the current-voltage conversion circuit 270, whereby the voltage $V_D$ represent already a filtered signal, in which the modulated offset of the operational amplifier 260 has been removed.

For example, in the embodiment considered, the filter 274 may be a passive low pass filter implemented by connecting a capacitor $C_D$ in parallel with the resistor $R_D$.

Figure 6:
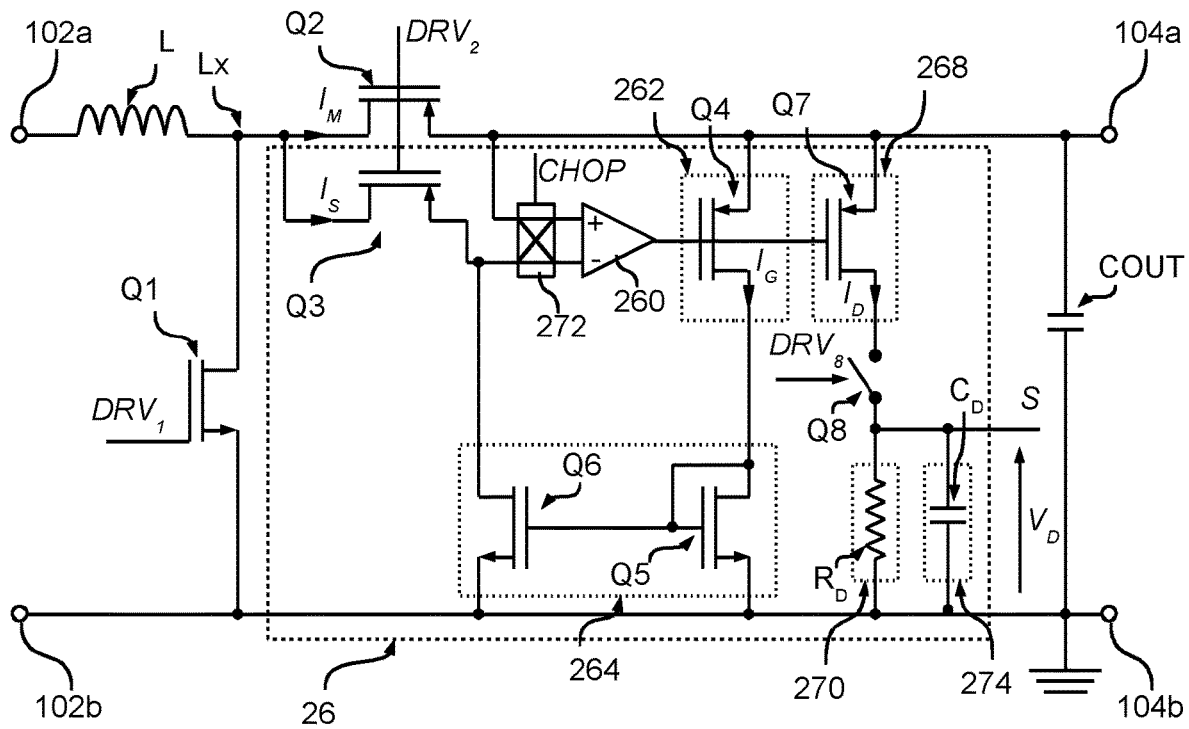
FIG. 6 shows a third embodiment of a boost converter comprising a sensor circuit in accordance with the present description.

FIG. 6 shows a further embodiment of the sensor circuit 26. Specifically, in the embodiment considered, an electronic switch Q8 is connected between the variable current generator 268 and the filter 274 and current-voltage conversion circuit 270.

Specifically, when the electronic switch Q8 is closed, the current $I_D$ provided by the variable current generator 268 will be filtered and the voltage $V_D$ provided by the filter 274 and current-voltage conversion circuit 270 will be proportional to the filtered current $I_D$. Conversely, when the electronic switch Q8 is opened, the voltage $V_D$ provided by the filter and current-voltage conversion circuit 270 will remain substantially stable (at least when considering brief periods).

Accordingly, in the embodiment considered, the electronic switch Q8 and the filter 274 essentially implement an analog storage element of the voltage $V_D$. Accordingly, in various embodiments, the control circuit 20 may also generate a drive signal $DRV_8$ for the electronic switch Q8 in order to: a) close the electronic switch Q8 when the second transistor Q2 is closed and current is flowing through the second transistor Q2, and b) open the electronic switch Q8 when the second transistor Q2 is opened.

However, when the electronic switch Q8 is opened, the output terminal of the variable current generator 268 would, in principle, be floating. However, due to parasitic capacitances $C_{par}$ at the output of the variable current generator 268, the voltage at the output terminal will usually increase. For example, in the embodiment considered, the voltage of the drain terminal of the seventh transistor Q7 may increase essentially up to the output voltage $V_{OUT}$. When the electronic switch Q8 is closed again, the filter 274 and current-voltage conversion circuit 270 will again be connected to the output terminal of the variable current generator 268.

For example, in the embodiment considered, the parasitic capacitances $C_{par}$ will transfer in this moment a charge $Q_{par}$ to the filter 274 and current-voltage conversion circuit 270, corresponding e.g. to: $Q_{par}=C_{par}(V_{OUT}-V_D)$.

In case the current $I_D$ is high, this parasitic charge $Q_{par}$ may be neglected. Conversely, in practical implementations, the current $I_D$ can be made be as small as possible in order to reduce the electrical losses. Accordingly, in this case, the parasitic charge $Q_{par}$ could significantly vary the voltage $V_D$.

Figure 7:
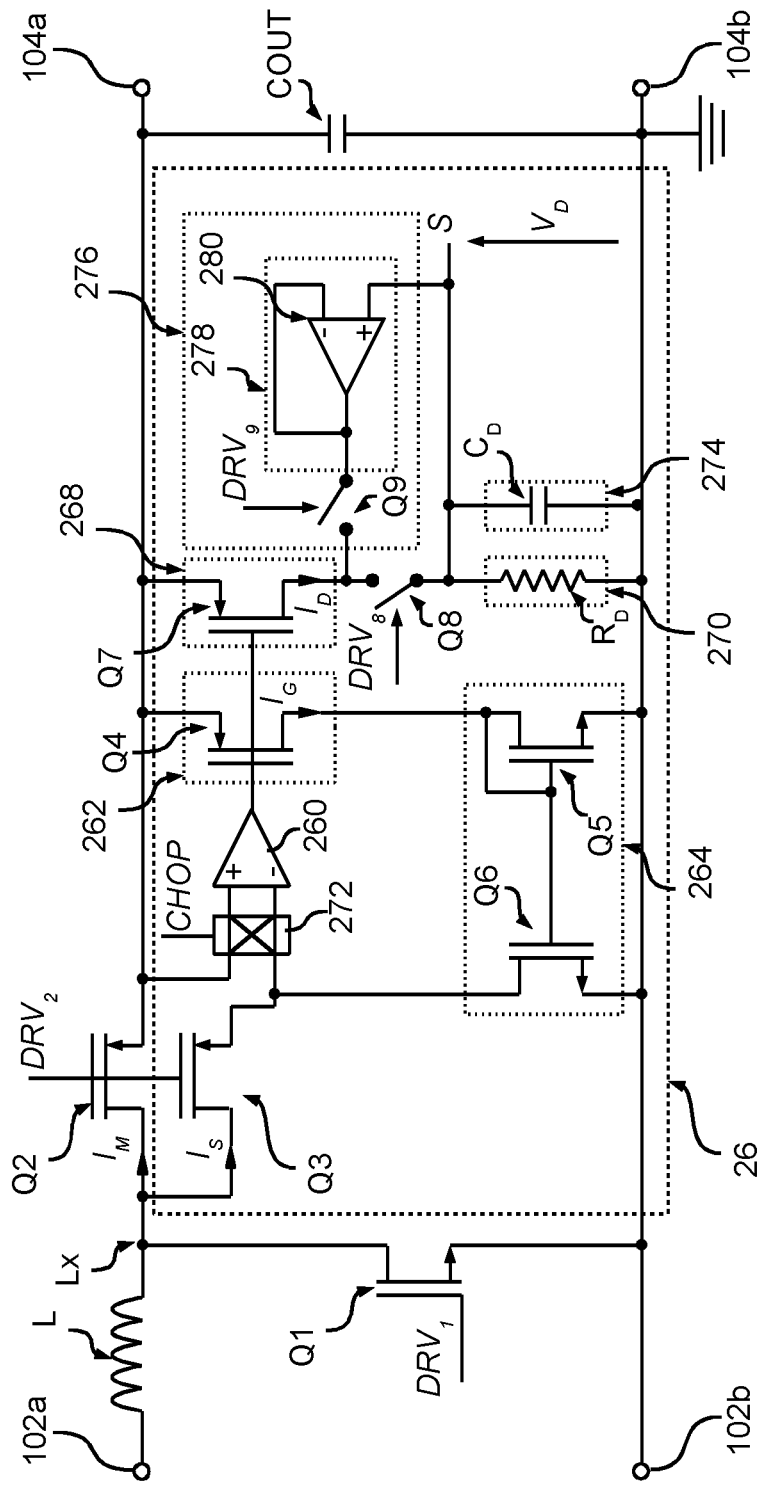
FIG. 7 shows a fourth embodiment of a boost converter comprising a sensor circuit in accordance with the present description.
Figure 8:
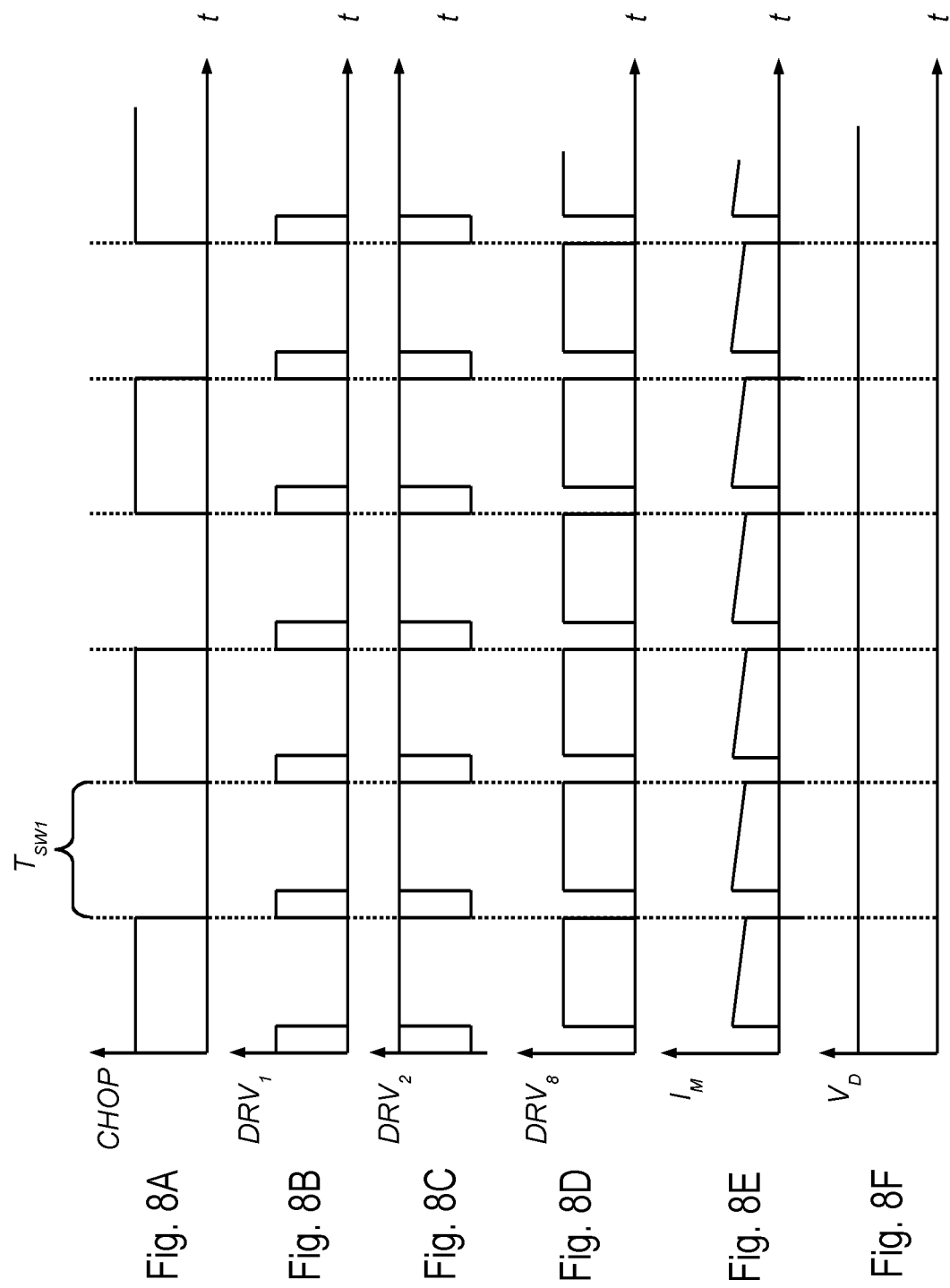
FIG. 8, which includes

Accordingly, FIG. 7 shows a further embodiment, wherein a stabilizer circuit 276 is introduced in the sensor circuit 26. Specifically, this stabilizer circuit 276 is configured to impose the voltage $V_D$ at the output terminal of the variable current generator 268, when the electronic switch Q8 is opened.

For example, in various embodiments, the stabilizer circuit 276 comprises a voltage follower 278 configured to provide at its output the voltage $V_D$. For example, in the embodiment considered, the voltage follower 278 is implemented with an operation amplifier 280 which receives at the non-inverting/positive input terminal the voltage $V_D$ and the output terminal of the operation amplifier 280 is connected to the inverting/negative input terminal of the operation amplifier 280. The stabilizer circuit 276 comprises moreover an electronic switch Q9 configured to selectively connect the output terminal of the voltage follower 278/operational amplifier 280 to the output terminal of the variable current generator 268.

Accordingly, in various embodiments, the electronic switch Q9 is closed when the electronic switch Q8 is opened, and the electronic switch Q9 is opened when the electronic switch Q8 is closed. For example, in various embodiments, the control circuit 20 may also generate a drive signal $DRV_9$ for the electronic switch Q9.

Generally, the chopper circuit 272, the filter 274 and/or the stabilizer circuit 276 may also be used when monitoring the current flowing through an n-channel FET, such as the first transistor Q1.

FIGS. 8A to 8F show possible waveforms of: FIG. 8A) the signal CHOP used for the chopping of the input terminals of the operational amplifier 260; FIG. 8B) the drive signal $DRV_1$ for the first transistor Q1; FIG. 8C) the drive signal $DRV_2$ for the second transistor Q2; FIG. 8D) the drive signal $DRV_8$ for the electronic switch Q8, wherein the drive signal $DRV_9$ for the electronic switch Q9 corresponds to an inverted version of the signal $DRV_8$; FIG. 8E) the current $I_M$ flowing through the second transistor Q2; and FIG. 8F) the voltage $V_D$ provided by filter 274 and current-voltage conversion circuit 270.

In the embodiments described with respect to FIGS. 4, 5, 6 and 7, instead of using a single third transistor Q3, a plurality of transistors Q3 connected in series may be used. For example, this permits to place the transistors Q3 in the vicinity of (e.g. around) the second transistor Q2 in order to ensure that the transistors Q3 exhibit the same temperature variations as the second transistor Q2.

Figure 9:
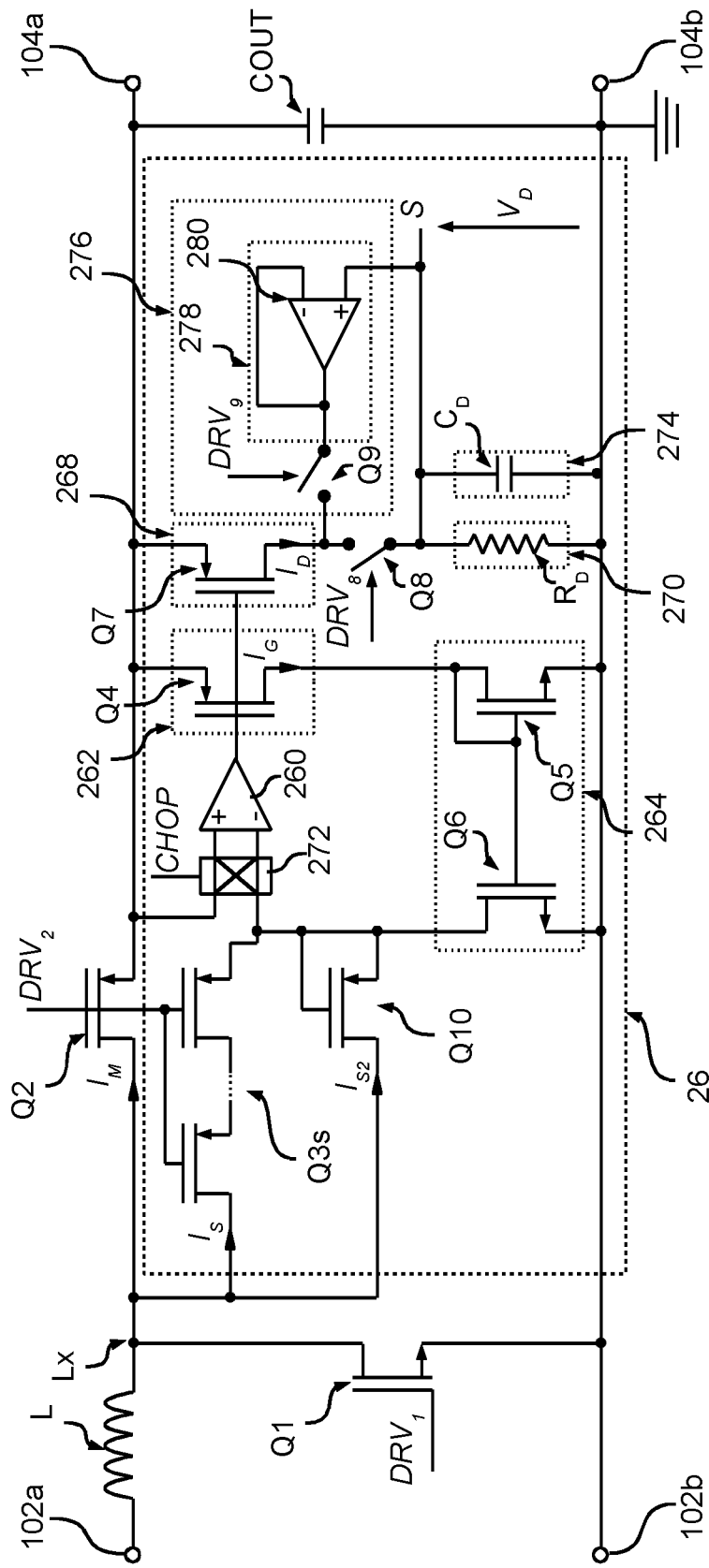
FIG. 9 shows a fifth embodiment of a boost converter comprising a sensor circuit in accordance with the present description.

Specifically, as shown in FIG. 9, when using a plurality of p-channel FETs for the third transistor Q3, the current paths of the transistors are connected in series, i.e.: the drain terminal of the first transistor is connected to the drain terminal of the second transistor Q2 and the source terminal of the first transistor is connected to the drain terminal of a following transistor; the drain terminal of the last transistor is connected to the source terminal of a previous transistor and the source terminal of the last transistor is connected to the operational amplifier 260/chopper circuit 272; and in case one or more intermediate transistors are also used, the drain terminal of each intermediate transistor is connected to the source terminal of a previous transistor and the source terminal of each intermediate transistor is connected to the drain terminal of a following transistor.

Conversely, the gate terminals of these transistors are connected to the gate terminal of the second transistor Q2.

However, in this case, when the second transistor Q2 may also be operated in the down-mode, the series connection of transistors would not provide the same diode behavior as the second transistor Q2, i.e. the current $I_S$ and $I_M$ would not be proportional anymore with the scaling factor M.

FIG. 9 thus shows an embodiment, which may also be used to reliably sense the current $I_M$ when the converter is operated in the down mode, i.e. when the second transistor Q2 is essentially used as a diode. Generally, while FIG. 9 shows the architecture of the sensor circuit 26 as shown with respect to FIG. 7, the same considerations apply also to the sensor circuits of FIGS. 4, 5 and 6.

Specifically, in the embodiment considered, when the converter is operated in down mode, the control circuit 20 is configured to short circuit the gate and source terminals of the second transistor Q2.

In the embodiment considered, an additional branch is connected in parallel with the third transistor Q3 or the series connection of third transistors Q3s as the case may be. Specifically, this branch comprises a single transistor Q10, wherein the drain terminal of the single transistor Q10 is connected to the drain terminal of the third transistors Q3s (i.e. the drain terminal of the second transistor Q2) and the source terminal of the single transistor Q10 is connected to the source terminal of the last third transistor of the third transistors Q3s, i.e. the current mirror 264.

Moreover, in the embodiment considered, in order to implement the down-mode, the gate terminal of the single transistor Q10 is connected to the source terminal of the single transistor Q10.

In various embodiments, also the single transistor Q10 corresponds to a scaled version of the second transistor Q2. However, in this case, the scaling should ensure that the scaling M of the current $I_M$ applies, when the second transistor Q2 and the single transistor Q10 are operated as diodes, i.e. the current $I_{S2}$, flowing through the single transistor Q10 should correspond to $I_M/M$ when the second transistor Q2 is operated as diode.

In various embodiments, also the single transistor Q10 is integrated together with the second transistor Q2 in the same integrated circuit, and may be placed in the vicinity of the second transistor Q2 in order to be subject to the same temperature variations.

Accordingly, in various embodiments, no calibration of the offset of the operational amplifier 260 may be required. Moreover, by placing the third transistor Q3 (or the series connection of third transistors Q3s as the case may be) and optionally the single transistor Q10 in the vicinity of the second transistor Q2 within the same integrated circuit, a technology and temperature matching may be obtained.

Moreover, the current may also be measured when the second transistor Q2 is operated in down-mode. Specifically, as described with respect to FIG. 9, in this case may be used an additional single transistor Q10, which is only used for the down-mode of operation, or generally when the gate and source terminals of the second transistor Q2 are short-circuited.

Generally, as mentioned before, the single transistor Q10 for monitoring the current $I_M$ when the second transistor Q2 is operated in the down-mode, may be used in any of the previous embodiments shown in FIGS. 4 to 7.

Moreover, while the embodiments have been described at the specific example of a boost converter, the second transistor Q2 and the sensor circuit 26 may also be used in other applications. For example, the second transistor Q2 may be used in place of a free-wheeling diode of a flyback-convert or as high side switch of an inverting buck-boost converter.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A sensor comprising:
a first transistor comprising a first terminal and a second terminal that define a current path, and a first control terminal configured to receive a drive signal;
a second transistor comprising a third terminal, a fourth terminal, and a second control terminal, wherein the third terminal is connected to the first terminal of the first transistor, wherein the second control terminal is configured to receive the drive signal, and wherein the second transistor is a scaled version of the first transistor;
an operational amplifier comprising a first input terminal connected to the second terminal, a second input terminal connected to the fourth terminal, and an output terminal, the operational amplifier being configured to generate an intermediate signal at the output terminal;
a variable current source configured to generate a first variable current as a function of the intermediate signal;
a current mirror connected to the variable current source and the second input terminal of the operational amplifier, the current mirror being configured to generate a second variable current as a feedback current to the second input terminal and the fourth terminal, the second variable current being proportional to the first variable current;
a measurement circuit configured to generate a measurement signal by monitoring a second current flowing through the second transistor or the first variable current, the measurement signal indicative of a first current flowing through the first transistor; and
a chopper circuit associated with the operational amplifier, wherein the chopper circuit is configured to shift an offset of the operation amplifier as a function of a chopping control signal comprising a higher frequency than a signal frequency of the drive signal.

2. The sensor of claim 1, further comprising:
a filter circuit configured to filter the measurement signal in order to remove the higher frequency of the chopping control signal from the measurement signal.

3. The sensor of claim 1, wherein the current mirror is connected between the variable current source and the fourth terminal.

4. The sensor of claim 1, wherein the first transistor is a first p-channel field-effect transistor (FET), the second transistor is a second p-channel FET, and the sensor further comprises a third p-channel FET comprising:
a drain terminal connected to the first terminal;
a source terminal connected to the fourth terminal;
a gate terminal connected to the source terminal;
wherein the third p-channel FET is a scaled version of the first p-channel FET; and
wherein, the operational amplifier is further configured to regulate, via the variable current source and the current mirror and when the second terminal and the first control terminal of the first p-channel FET are short-circuited, a first voltage at the source terminal to a second voltage at the second terminal so that a third current flows through the third p-channel FET which is proportional to the first current flowing through the first transistor.

5. The sensor of claim 1, wherein:
the first input terminal is a positive input terminal of the operational amplifier; and
the second input terminal is a negative input terminal of the operational amplifier.

6. The sensor of claim 1, wherein the variable current source comprises a third transistor comprising:
a fifth terminal connected to a reference voltage, the fifth terminal being connected to the second terminal, wherein voltage at the second terminal is used as the reference voltage;
a sixth terminal configured to provide the first variable current; and
a third control terminal connected to the output terminal.

7. The sensor of claim 1, wherein the current mirror comprises:
a first n-channel field-effect transistor (FET) comprising a first drain terminal connected to a variable current source output of the variable current source, a first source terminal connected to a ground, and a first gate terminal connected to the first drain terminal; and
a second n-channel FET comprising a second drain terminal connected to the fourth terminal, a second source terminal connected to the ground, and a second gate terminal.

8. The sensor of claim 1, further comprising:
a capacitor connected between the measurement circuit and a ground;
wherein the measurement circuit comprises a third transistor and a first electronic switch, the third transistor comprising a fifth terminal connected to a reference voltage; a sixth terminal configured to provide a third variable current proportional to the first variable current, and a third control terminal connected to the output terminal; and
wherein the first electronic switch is connected between the capacitor and the sixth terminal.

9. The sensor of claim 8, wherein the measurement circuit further comprises:
a voltage follower connected in parallel with the first electronic switch and configured to provide, at a measurement circuit output, a voltage at the capacitor; and
a second electronic switch connected between an output of the voltage follower and the sixth terminal.

10. The sensor of claim 1, wherein the second transistor is implemented with a plurality of field-effect transistors having current paths connected in series.

11. The sensor of claim 1, wherein the sensor is implemented within an integrated circuit.

12. An electronic converter comprising:
a switching stage comprising a first transistor and a second transistor, the second transistor being a scaled version of the first transistor, wherein
the first transistor comprises a first terminal and a second terminal defining a current path, and a first gate terminal configured to receive a drive signal, and wherein
the second transistor comprises a third terminal, a fourth terminal, and a second gate terminal, wherein the third terminal is connected to the first terminal of the first transistor, and wherein the second gate terminal is configured to receive the drive signal; and a sensor circuit configured to generate a measurement signal indicative of a first current flowing through the first transistor, the sensor circuit comprising
an operational amplifier comprising a first input terminal connected to the second terminal, a second input terminal connected to the fourth terminal, and an output terminal, the operational amplifier being configured to generate an intermediate signal at the output terminal,
a variable current source configured to generate a first variable current as a function of the intermediate signal,
a current mirror connected to the variable current source and second input terminal of the operational amplifier, the current mirror being configured to generate a second variable current as a feedback current to the second input terminal and the fourth terminal,
a chopper circuit associated with the operational amplifier, wherein the chopper circuit is configured to shift an offset of the operation amplifier as a function of a chopping control signal comprising a higher frequency than a signal frequency of the drive signal, and
a measurement circuit configured to generate the measurement signal by monitoring a second current flowing through the second transistor or the first variable current.

13. The electronic converter of claim 12, wherein the sensor circuit further comprises:
a filter circuit configured to filter the measurement signal in order to remove the higher frequency of the chopping control signal from the measurement signal.

14. The electronic converter of claim 12, wherein the second variable current is proportional to the first variable current.

15. The electronic converter of claim 14, wherein the current mirror comprises:
a first n-channel field-effect transistor (FET) comprising a first drain terminal connected to a variable current source output of the variable current source, a first source terminal connected to a ground, and a third gate terminal connected to the first drain terminal; and
a second n-channel FET comprising a second drain terminal connected to the fourth terminal, a second source terminal connected to the ground, and a fourth gate terminal connected to the third gate terminal.

16. The electronic converter of claim 12, wherein the first transistor is a first p-channel field-effect transistor, wherein the second transistor is a second p-channel FET, and wherein the sensor circuit further comprises a third p-channel FET comprising:
a drain terminal connected to the first terminal;
a source terminal connected to the fourth terminal; and
a third gate terminal connected to the source terminal,
wherein the third p-channel FET is a scaled version of the first p-channel FET, and
wherein, the operational amplifier is further configured to regulate, using the variable current source and the current mirror, a first voltage at the source terminal to a second voltage at the second terminal so that a third current flows through the third p-channel FET which is proportional to the first current flowing through the first transistor.

17. A method of operating an electronic converter, the method comprising:
- driving a first transistor and a second transistor with a drive signal, wherein a first current flows through the first transistor, and wherein a second current flows through the second transistor;
- generating a first variable current at a variable current source as a function of an output signal of an operational amplifier connected to the first transistor and the second transistor;
- generating a second variable current as a feedback current to an input of the operational amplifier and an output of the second transistor using a current mirror connected to the variable current source and the input of the operational amplifier, the second variable current being proportional to the first variable current;
- shifting an offset of the operational amplifier as a function of a chopping control signal comprising a signal frequency a higher frequency than a signal frequency of the drive signal;
- generating a measurement signal indicative of the first current by monitoring one or more of: the second current and the first variable current; and
- varying the drive signal as a function of the measurement signal.

18. The method of claim 17, further comprising:
filtering the measurement signal in order to remove the higher frequency of the chopping control signal from the measurement signal.

19. The method of claim 17, further comprising:
regulating a voltage at the second transistor using a regulation loop comprising the operational amplifier, the variable current source, and the current mirror.

20. The method of claim 17, wherein:
- the first transistor comprises a first source/drain terminal and a second source/drain terminal defining a current path, and a first gate terminal configured to receive the drive signal;
- the second transistor comprises a third source/drain terminal connected to the first source/drain terminal of the first transistor, a fourth source/drain terminal, and a second gate terminal configured to receive the drive signal, the second transistor being a scaled version of the first transistor; and
- the method further comprises regulating voltage at the fourth source/drain terminal to voltage at the second source/drain terminal using the operational amplifier, the variable current source, and the current mirror.

* * * * *